US006236478B1

(12) United States Patent
Stoll

(10) Patent No.: US 6,236,478 B1
(45) Date of Patent: May 22, 2001

(54) METHOD FOR MONITORING OPTICAL COMMUNICATION EQUIPMENT

(75) Inventor: Detlef Stoll, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/338,428

(22) Filed: Jun. 23, 1999

(30) Foreign Application Priority Data

Jun. 23, 1998 (DE) ............................................. 198 27 915

(51) Int. Cl.[7] ..................................................... H04B 10/08
(52) U.S. Cl. ............................................................ 359/110
(58) Field of Search ................................................ 359/110

(56) References Cited

U.S. PATENT DOCUMENTS 4,449,247 * 5/1984 Waschka, Jr. ............................ 455/9
5,329,392 * 7/1994 Cohen ................................... 359/124
5,532,864 * 7/1996 Alexander et al. .................. 359/177
5,859,302 * 12/1998 Strasser et al. ...................... 359/127
6,064,501 * 5/2000 Roberts et al. ...................... 359/110

* cited by examiner

Primary Examiner—Leslie Pascal
Assistant Examiner—Vu Lieu
(74) Attorney, Agent, or Firm—Bell, Boyd & Lloyd LLC

(57) ABSTRACT

A monitoring method for optical communication equipment wherein the levels of the total signals on a plurality of optical fibers are checked, the signal qualities of the individual communication channels which are respectively transmitted on one fiber are cyclically monitored, and all criteria are evaluated in order to establish a monitoring algorithm by which the critical channels are monitored more intensively than reliable ones.

8 Claims, 1 Drawing Sheet

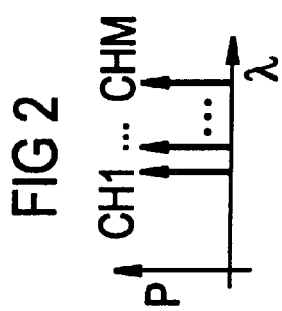
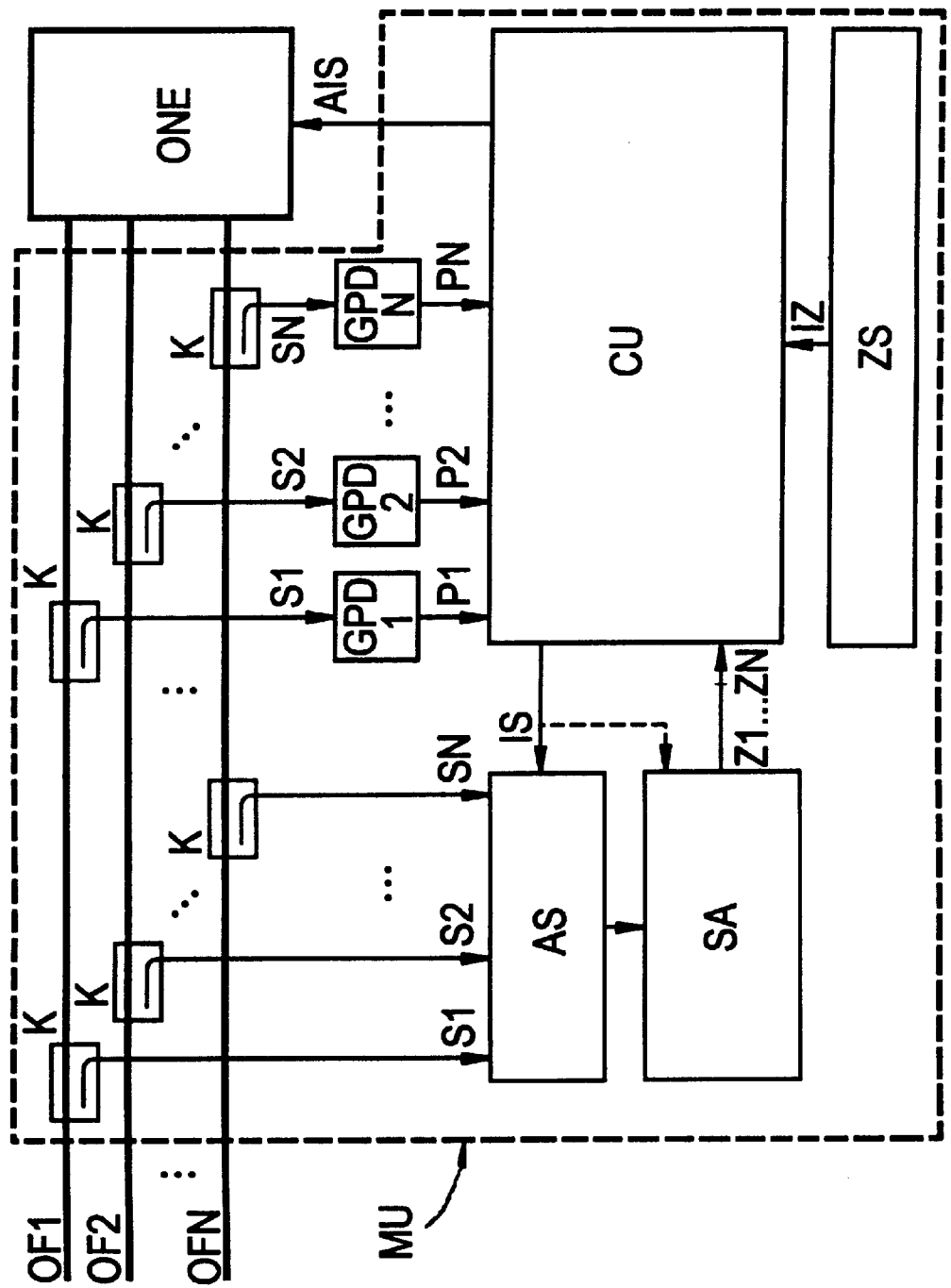

METHOD FOR MONITORING OPTICAL COMMUNICATION EQUIPMENT

BACKGROUND OF THE INVENTION

1. Field of the Invention

The present invention relates, generally, to a method for monitoring optical communication equipment and, more specifically, to a monitoring method wherein both the levels of the total signals on a plurality of optical fibers are checked and the signal qualities of individual communication channels respectively transmitted on one fiber are monitored in order to establish a monitoring algorithm by which critical channels are monitored more intensively than reliable ones.

2. Description of the Prior Art

Monitoring problems in an optical transport network are described, for example, in "IEEE Journal on Selected Areas in Communications", Vol. 14, No. 5, June 1996, pp. 914–922. At present, optical communication systems (All Optical Networks/Photonic Transport Networks) are in the standardization phase. This entails an orientation to the existing standards for synchronous communication systems (SDH-Synchronous Digital Hierarchy; SONET—Synchronous Optical Network) in the defining of the characteristic structural features; the aim being a maximum structural similarity of the network structures. In purely optical add/drop multiplexers or cross-connectors, which may be employed medium-term, there are approximately 30 to 300 optical channels to be wired to one another. As is already the case in known synchronous communication systems, rather high requirements are placed upon the operating reliability in the purely optical systems. However, these can be guaranteed only if the optical channels are continuously individually monitored with respect to their signal quality and if substitute transmission paths are immediately available in case of error.

The time-span between the arising of an error and the completion of the substitution process is 50 ms in synchronous networks. In order to be able to integrate the new purely optical communication systems into the overall communication network without complications, these reaction times must be maintained or even shortened. However, a monitoring of all the optical communication channels using conventional transmission equipment is associated with prohibitive technical outlay and, thus, with prohibitive costs.

It is therefore an object of the present invention to offer a method for monitoring optical communication systems having a plurality of optical channels, wherein the method can be realized cost-effectively.

SUMMARY OF THE INVENTION

What distinguishes the monitoring system of the present invention is that, unlike conventional methods, the total signals (wavelength division multiplex signals) which are respectively transmitted on one fiber and their individual optical communication channels are monitored separately. Also unlike conventional methods, priorities are set particularly in the monitoring of the individual optical channels. As such, endangered connections and critical communication channels are monitored more intensively than others.

The priorities are determined with the aid of an evaluation system which functions on the basis of algorithms of neural networks; i.e., the basis of fuzzy logic as well as rule-based algorithms (expert systems). This evaluation system delivers an observation sequence which allows the recognition of errors within the prescribed reaction time with the greatest possible probability at given the lowest possible outlay. The main advantage resides in the reduction of the wiring outlay for the monitoring equipment.

Another advantage of the present invention is the learning behavior, so that the option exists of further improving the reliability of the error detection during the operation without having to change the hardware. The ability to easily differentiate the signal quality allows the advantageous application of fuzzy logic.

In an embodiment, a method is provided for monitoring optical signals on a plurality of optical fibers wherein the method includes the steps of: simultaneously detecting a total level for each of the plurality of optical fibers; deriving a total value criterion from the total level; evaluating the total value criterion; monitoring communication channels of the plurality of optical fibers in a cyclical manner; deriving channel quality criteria from the monitoring; evaluating the channel quality criteria; and controlling a monitoring algorithm for the plurality of optical fibers based on the evaluation of both the total value criterion and the channel quality criteria wherein critical communication channels are monitored more intensively.

In an embodiment of the method, the total levels are evaluated according to fuzzy logic criteria.

In an embodiment, a method for monitoring optical signals is provided which further includes the step of evaluating changes of the total level on the plurality of optical fibers.

In an embodiment, a method for monitoring optical signals is provided which further includes the step of evaluating qualities of the individual communication channels.

In an embodiment of the method, the evaluation of both the total value criterion and the channel quality criteria occurs via learning algorithms.

In an embodiment of the method, the evaluation of both the total value criterion and the channel quality criteria occurs via rule-based algorithms.

In an embodiment, a method for monitoring optical signals is provided which further includes the steps of determining additional information about errors in the optical fibers and the communication channels; and using the additional information in controlling the monitoring algorithm.

In an embodiment, a method for monitoring optical signals is provided which further includes the steps of determining an error situation based on monitoring results; and prompting equivalent circuits by at least one of channel, fiber and assembly.

Additional features and advantages of the present invention are described in, and will be apparent from, the Detailed Description of the Preferred Embodiments and the Drawing.

DESCRIPTION OF THE DRAWINGS

FIG. 1 shows an embodiment of the method of the present invention in block diagram form; and FIG. 2 shows the channels which are transmitted via one fiber in the present invention.

DETAILED DESCRIPTION OF THE PREFERRED EMBODIMENTS

FIG. 1 illustrates an optical network element ONE and the appertaining monitoring equipment MU. The wavelength division multiplex signals on optical fibers OF1 to OFN are to be monitored. Each of these signals consists of a plurality of individual signals which correspond to the number of communication channels CH1 to CHM (FIG. 2) that are transmitted via one fiber in the wavelength division multiplex method. FIG. 2 illustrates the levels P of the communication channels CH1 to CHM over the wavelength λ for a multiplex signal that is transmitted via a fiber.

Via couplers K, measuring signals S1 to SN are decoupled from a respective optical fiber and are fed to total level detectors GPD to GPDN (e.g., photodiodes) and also, via additional couplers K, to an optical spectrum analyzer SA via a selector switch AS (optical multiplexer). The spectrum analyzer can analyze the channels which are allocated to individual fibers in parallel, which saves time. If time allows, in order to reduce costs, the individual channels also can be analyzed in succession in a more simply constructed spectrum analyzer.

The output quantities of the total level, the sum signal criteria P1 to PN, are fed to an evaluation unit CU (a processor) by the total level detectors GPD1 to GPDN and are therein monitored. The channel quality criteria Z1 to ZN of a respective fiber are supplied by the spectrum analyzer in parallel. The evaluation unit, in turn, controls both the selector switch AS by a selection signal IS (Information Select) and the spectrum analyzer, if necessary. The total levels are evaluated according to the criteria of fuzzy logic. Fuzzy systems first perform classification tasks, such as signal loss that is too high, ideal, or too low. These quantities are further processed by neural algorithms, whereby derived quantities such as level alterations also can be evaluated. Sharp level alterations within a few milliseconds can indicate an imminent fiber breakage (bulldozer effect). Abrupt level fluctuations can indicate the failure of an optical amplifier or a laser. Neuro fuzzy systems are described in "Neurale Netze und Fuzzy-Systeme" (Nauck, Klawonn and Kruse; Friedrich Vieweg and Son, 1994:377–416), for example.

The evaluation unit CU determines a monitoring algorithm or observation cycle, potentially with specific monitoring specifications for individual communication channels, which is adapted with high probability to the arising of disturbances. As such, it allows them to be reliably detected.

Via the selector switch and the spectrum analyzer, the quality (level, pulse shape, wavelength) of signals of individual channels, and thus the allocated laser, is monitored. Based on the results of the quality evaluation of the individual channels, the observation criteria, frequency and period are established. For a precise analysis, the evaluation unit has the ability, via the selection signal IS, to feed critical signals to a detailed optical analysis in order to obtain a more detailed monitoring signal (channel quality criterion). Fibers or, respectively, channels carried thereon which appear critical undergo a more frequent and potentially more precise monitoring by the spectrum analyzer.

On the basis of the arising monitoring results, the monitoring algorithm is optimized in the framework of the allowable conditions. To improve the monitoring effectiveness, already existing (stored) additional information IZ can be utilized which indicates the probability of errors arising. Such information can be the length of optical paths and their susceptibility to disturbances, for example. This information, which is stored in an additional information memory ZS, also can be modified on the basis of experimental values.

Preventively, or in response to suddenly arising changes, the monitoring equipment generates a protection signal AIS in order to realize a suitable equivalent circuit. Not only can the selection of another communication channel occur, but also a line protection (connection) or a card protection (assembly) can be provided. It is possible to realize all known methods of protection circuits.

A precautionary equivalent changeover of a communication channel, fiber or assembly that includes disturbances prevents the arising of errors and contributes particularly to the reliability of the transmission system.

Although the present invention has been described with reference to specific embodiments, those of skill in the art will recognize that changes may be made thereto without departing from the spirit and scope of the invention as set forth in the hereafter appended claims.

I claim as my invention:

1. A method for monitoring optical signals on a plurality of optical fibers, the method comprising the steps of:
   simultaneously detecting a total level for each of the plurality of optical fibers;
   deriving a total value criterion from the total level;
   evaluating the total value criterion;
   monitoring communication channels of the plurality of optical fibers in a cyclical manner;
   deriving channel quality criteria from the monitoring;
   evaluating the channel quality criteria; and
   controlling a monitoring algorithm for the plurality of optical fibers based on the evaluation of both the total value criterion and the channel quality criteria wherein critical communication channels are monitored more intensively.

2. A method for monitoring optical signals as claimed in claim 1, wherein the total levels are evaluated according to fuzzy logic criteria.

3. A method for monitoring optical signals as claimed in claim 1, further comprising the step of:
   evaluating changes of the total level on the plurality of optical fibers.

4. A method for monitoring optical signals as claimed in claim 1, further comprising the step of:
   evaluating qualities of the individual communication channels.

5. A method for monitoring optical signals as claimed in claim 1, wherein the evaluation of both the total value criterion and the channel quality criteria occurs via learning algorithms.

6. A method for monitoring optical signals as claimed in claim 1, wherein the evaluation of both the total value criterion and the channel quality criteria occurs via rule-based algorithms.

7. A method for monitoring optical signals as claimed in claim 1, further comprising the steps of:
   determining additional information about errors in the optical fibers and the communication channels; and
   using the additional information in controlling the monitoring algorithm.

8. A method for monitoring optical signals as claimed in claim 1, further comprising the steps of:
   determining an error situation based on monitoring results; and
   prompting equivalent circuits by at least one of channel, fiber and assembly.

* * * * *